3,521,723
SAFETY BELT FOR AUTOMOBILES
Robert U. Snodgrass, 2206 Cales Drive,
Arlington, Tex. 76010
Filed Aug. 22, 1968, Ser. No. 754,573
Int. Cl. B60r 21/10
U.S. Cl. 180—82          3 Claims

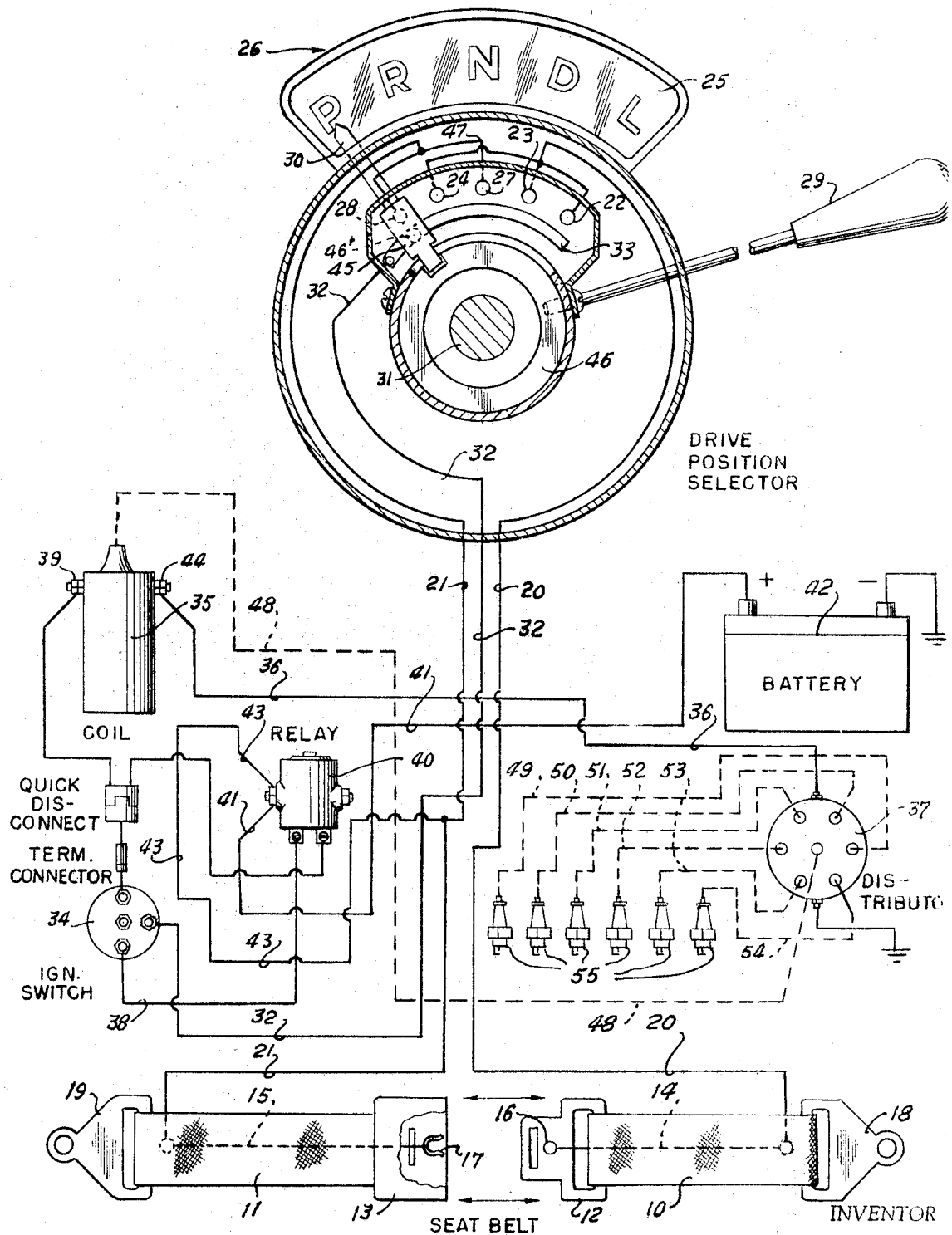

ABSTRACT OF THE DISCLOSURE

A seat belt for automobiles having an electrical conductor therein connected through the ignition circuit of a vehicle and through the drive positions of the transmission shift lever whereby, while the belt is uncoupled, the ignition circuit is broken when the shift lever is in any of the drive positions and cannot be closed until the belt is coupled thus preventing the vehicle engine from functioning.

The circuits are so arranged through the belt and the transmission shift assembly to enable the ignition circuit to be closed when the shift lever is in the "neutral" or "park" positions but opened when the shift lever is moved to any of the drive positions.

SUMMARY OF THE INVENTION

This invention relates to a safety device for automotive vehicles, and it has particular reference to a seat belt having an electrical conductor therein connected into the ignition circuit of the vehicle whereby the circuit is closed when the belt is coupled while the transmission shift lever is in any drive position.

A prime object of the invention resides in the provision of a safety device whereby to encourage the use of a seat belt by the operator of a motor vehicle and to associate the belt with the ignition circuit of the vehicle engine in such manner as to necessitate the coupling of the belt to complete the circuit except when the transmission shift lever is in a non-drive position.

A further object of the invention is that of providing a seat belt having an electrical connection to the ignition circuit of a motor vehicle in such manner that the operator is prevented from starting the engine without coupling the belt except when the transmission lever is adjusted to a non-drive position.

Broadly, the invention seeks to provide means by which the operator of a motor vehicle can start its engine, and maintain its operation, although uncoupling the safety belt, by moving the transmission shift lever to any non-drive position, such as in the "neutral" or "park" positions.

While the foregoing objects are paramount, other and lesser objects will become apparent, as the description proceeds, when considered in connection with the appended drawing wherein the single figure is a diagrammatic illustration, in solid lines, of a typical automotive ignition circuit in which the invention is shown connected, the broken lines indicating the distributor circuit.

Heretofore there have been devised a variety of safety belts for motor powered vehicles whereby such belts are in some manner connected into the ignition circuits of the vehicle engines so that the belts must be coupled in order to start the engines, and when uncoupled, the ignition circuits are broken and the engines are stopped until the belts are recoupled.

Such devices, while capable of functioning in the manner and for the purpose intended, present certain problems such as that of preventing the vehicle operator from freely moving about in his seat while the vehicle is standing or parked without turning off the ignition circuit. It is often necessary or desirable to have the engine operating while performing some adjustments, or for other reasons, and the invention affords a medium by which this can be accomplished without maintaining a closed ignition circuit through the seat belt.

The drawing illustrates diagrammatically the embodiment of the invention, and shows the two sections 10 and 11 of the seat belt uncoupled, the male and female coupling members being indicated by the numerals 12 and 13, respectively, the latter providing a receptacle into which the male member 12 is inserted to latch the belt about the vehicle operator and connect the electrical conductors 14 and 15 embedded in the sections 10 and 11 through the contacts 16 and 17 in the couplings 12 and 13. Anchor elements 18 and 19 are provided on opposing ends of the sections 10 and 11 of the belt.

The conductors 14 and 15 are connected, respectively, to conductors 20 and 21 which are connected, respectively, to terminal contacts 22, 23 and 24 on the drive position selector 25, represented by the letters "L," "D" and "R" on the indicator panel 26, and to the contacts 27 and 28 of the selector 25, represented by the letters "N" and "P." The drive selector 25 is of the conventional type, and the drawing shows the selector or shift lever 29 in the "park" position, the indicator 30 being at rest on the letter "P." The indicator panel 26 is normally located on the instrument panel (not shown) of the vehicle, and adjacent to the steering column 31.

A conductor 32 is connected to a slide contact strip 33 in the drive selector 25 and through the ignition switch 34 to the coil 35 which has a conductor 36 connected to the distributor 37. A conductor 38 connects the ignition switch 34 with the coil 35 through its terminal 39, and through the relay 40 which is connected by a conductor 41 to the battery 42 and to the conductor 21 through a conductor 43. The conductor 36 is connected to the terminal 44 of the coil 35.

The indicator 30 has a coupler bar 45 thereon by which it is connected to a collar 46 rotatably arranged about the steering column 31 and to which the selector lever 29 is attached. The coupler bar 45 has the terminal 28 thereon which complements a terminal 46' which is in sliding contact with the slide contact strip 33 so that when the indicator 30 is in the position shown in the drawing, or indicating the letter "P," or parking position, the ignition circuit is closed through the conductors 21 and 32. The same condition would prevail if the indicator 30 should be moverd to the position N" on the panel 25 so that the contacts 46' and 27 are joined, there being a connection 47 between the contacts 27 and 28.

In broken lines is shown a conductor 48 connecting the coil 35 with the distributor 37, and conductors 49, 50, 51, 52, 53 and 54 connecting the distributor 37 to the several spark plugs 55.

OPERATION

In operation, when the belt sections 10 and 11 are coupled through the elements 12 and 13, and the contacts 16 and 17 are joined, the vehicle ignition circuit can be closed only when the indicator 30 is in the position indicating "Park" or "Neutral" represented on the selector panel 25 by the letters "P" and "N." This arrangement is common to the conventional ignition circuits and prevents the operator from starting the engine in any drive position of the indicator lever 29. However, in the instant disclosure, the ignition circuit cannot be closed when the drive position indicator 30 is pointed to any position designated by the letters "L," "D," or "R," representing the drive positions "Low," "Drive," and "Reverse." The only positions of the indicator 30 in which the motor vehicle engine can be motivated are "P" for "Park," or "N" for "Neutral." Thus it will not be necessary that the belt 10–11 be joined to enable the vehicle engine to be started or maintained in operation if the drive lever 29 is positioned so that the indicator 30 is directed to the park or neutral positions, but only when the indicator 30 is directed to the commonly designated "drive" positions "D," "L" and "R."

Such an arrangement enables the vehicle operator to dispense with the coupling of the seat belt while enabling the vehicle engine to operate when the vehicle is standing or parked but when the drive indicator 30 is moved to any "drive" position the vehicle engine is rendered inoperative unless the belt sections 10 and 11 are coupled to complete the ignition circuit.

The invention is designed to provide means by which the security provided by the conventional safety belt may be assured those who use such belts without being inconvenienced by disabling the vehicle engine without uncoupling the belt in certain positions of the indicator lever with respect to the mobile actions of the vehicle.

It is intended that the invention may not be limited to the specific design and structure described but that certain modifications therein may be resorted to by persons skilled in the art without departing from the spirit and intent thereof or from the scope of the appended claims.

What is claimed is:

1. In a safety device for an automobile having an automatic transmission, an ignition circuit and a switch in said circuit, a drive position indicator panel and an indicator thereon for indicating drive and non-drive positions of said vehicle, and a selector lever for said indicator, in combination, an electrical conductor in said ignition circuit connected to each of said drive and non-drive positions on said indicator whereby said ignition circuit can be closed by said switch when said indicator is in the non-drive positions and opened when said indicator is in any of the drive positions, and a safety belt having joinable sections, each having a conductor therein connected into said ignition circuit whereby, upon closing said ignition switch the ignition circuit can be closed when said indicator is in any of the drive positions and when said belt sections are joined.

2. In a safety device as described in claim 1, the said drive position panel having indicia thereon designating forward and reverse drive positions for said indicator, each connected into said ignition circuit to complete said circuit when the ignition switch is closed and when said belt sections are joined, and indicia on said panel designating non-drive positions for said indicator, each connected into said ignition circuit to complete said circuit when the ignition switch is closed without joining said belt sections.

3. In a safety device for an automobile, as described in claim 1 wherein the ignition circuit can be closed through the ignition switch and said belt sections only when said indicator is in one of the drive positions on said indicator panel.

References Cited

UNITED STATES PATENTS

| | | | |
|---|---|---|---|
| 2,740,947 | 4/1956 | Davies. | |
| 2,807,729 | 9/1957 | Redick. | |
| 3,215,221 | 11/1965 | Rayman | 180—82 |
| 3,226,674 | 12/1965 | Eriksson | 180—82 |
| 3,269,483 | 8/1966 | Garner | 180—103 |
| 3,343,622 | 9/1967 | Maurer | 180—82 |
| 3,426,864 | 2/1969 | Halperin | 180—82 |
| 3,438,455 | 4/1969 | Redmond | 180—82 |

KENNETH H. BETTS, Primary Examiner

U.S. Cl. X.R.

280—150; 307—10